United States Patent
Park (10) Patent No.: US 9,778,409 B2
(45) Date of Patent: *Oct. 3, 2017

(54) OPTICAL MEMBER, DISPLAY DEVICE, AND LIGHT EMITTING DEVICE HAVING THE SAME

(71) Applicant: LG INNOTEK CO., LTD., Seoul (KR)

(72) Inventor: Soung Kyu Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/875,413

(22) Filed: Oct. 5, 2015

(65) Prior Publication Data

US 2016/0025921 A1 Jan. 28, 2016

Related U.S. Application Data

(63) Continuation of application No. 14/241,751, filed as application No. PCT/KR2012/005316 on Jul. 4, 2012.

(30) Foreign Application Priority Data

Aug. 31, 2011 (KR) ........................ 10-2011-0088191

(51) Int. Cl.
*F21V 9/16* (2006.01)
*F21V 8/00* (2006.01)
(Continued)

(52) U.S. Cl.
CPC .............. *G02B 6/0053* (2013.01); *F21K 9/64* (2016.08); *G02B 6/005* (2013.01); *G02B 6/0058* (2013.01); *G02F 1/133606* (2013.01); *G02F 1/133617* (2013.01); *G02F 2001/133607* (2013.01); *G02F 2001/133614* (2013.01)

(58) Field of Classification Search
CPC .. G02B 3/0062; G02B 3/0068; G02B 6/0036; G02B 6/0038; G02B 6/005; G02B 6/0053; G02B 6/0058
See application file for complete search history.

(56) References Cited

U.S. PATENT DOCUMENTS 7,594,733 B2    9/2009 Goto
2006/0279953 A1  12/2006 Kim et al.
(Continued)

FOREIGN PATENT DOCUMENTS

JP    2009-158462 A    7/2009
JP    2010-170961 A    8/2010
(Continued)

OTHER PUBLICATIONS

English Machine translation for KR-10-2011-0080088-A, dated Jul. 12, 2011.

(Continued)

*Primary Examiner* — Alexander Garlen
(74) *Attorney, Agent, or Firm* — Birch, Stewart, Kolasch & Birch, LLP (57) ABSTRACT

Disclosed are an optical member and a display device. The display device includes a light source; a light conversion layer to convert a wavelength of light emitted from the light source; and a display panel into which the light is incident from the light conversion layer. Further, the light conversion layer includes a plurality of concave surfaces.

8 Claims, 6 Drawing Sheets

(51) Int. Cl.
  *G02F 1/1335* (2006.01)
  *F21K 9/64* (2016.01)

(56) References Cited

U.S. PATENT DOCUMENTS

| | | |
|---|---|---|
| 2007/0263408 A1 | 11/2007 | Chua |
| 2008/0037281 A1 | 2/2008 | Chang |
| 2008/0123023 A1 | 5/2008 | Doan et al. |
| 2009/0101930 A1 | 4/2009 | Li |
| 2009/0147497 A1 | 6/2009 | Nada |
| 2010/0103648 A1 | 4/2010 | Kim et al. |
| 2010/0187975 A1 | 7/2010 | Tsukahara et al. |
| 2010/0245719 A1 | 9/2010 | Shikii et al. |
| 2010/0315320 A1 | 12/2010 | Yoshida |
| 2010/0328754 A1 | 12/2010 | Yao |
| 2011/0128471 A1 | 6/2011 | Suckling et al. |
| 2011/0286200 A1 | 11/2011 | Imura et al. |
| 2012/0160560 A1 | 6/2012 | Kajiya et al. |
| 2012/0182714 A1 | 7/2012 | Kwon et al. |

FOREIGN PATENT DOCUMENTS

| | | |
|---|---|---|
| KR | 10-2009-0060149 A | 6/2009 |
| KR | 10-2011-0080088 A | 7/2011 |
| KR | 10-2011-0068110 A | 4/2015 |

OTHER PUBLICATIONS

U.S. Office Action dated Jul. 21, 2016, issued in copending U.S. Appl. No. 14/241,751.

OPTICAL MEMBER, DISPLAY DEVICE, AND LIGHT EMITTING DEVICE HAVING THE SAME

This application is a Continuation of copending U.S. application Ser. No. 14/241,751 filed on Feb. 27, 2014, which was filed as PCT International Application No. PCT/KR2012/005316 on Jul. 4, 2012, which claims the benefit under 35 U.S.C. §119(a) to Patent Application No. 10-2011-0088191, filed in Korea on Aug. 31, 2011, all of which are hereby expressly incorporated by reference into the present application.

BACKGROUND OF THE INVENTION

Field of the Invention

The embodiment relates to an optical member, a display device, and a light emitting device having the same.

Discussion of the Related Art

Recently, flat display devices, such as an LCD (liquid crystal display), a PDA (plasma display panel) or an OLED (organic light emitting diode), have been increasingly developed instead of conventional CRTs (cathode ray tubes).

Among them, the LCD includes a liquid crystal display panel having a thin film transistor substrate, a color filter substrate and a liquid crystal injected between the thin film transistor substrate and the color filter substrate. Since the liquid crystal display panel is a non-emissive device, a backlight unit is provided below the thin film transistor substrate to supply light. Transmittance of the light emitted from the backlight unit is adjusted according to the alignment state of the liquid crystal.

The backlight unit is classified into an edge-illumination type backlight unit and a direct-illumination type backlight unit according to the position of a light source. According to the edge-illumination type backlight unit, the light source is located at a lateral side of a light guide plate.

The direct-illumination type backlight unit has been developed as the size of the LCD has become enlarged. According to the direct-illumination type backlight unit, at least one light source is located below the liquid crystal display panel to supply the light over the whole area of the liquid crystal display panel.

When comparing with the edge-illumination type backlight unit, the direct-illumination type backlight unit can employ a large number of light sources so that the high brightness can be achieved. In contrast, the direct-illumination type backlight unit must have thickness larger than thickness of the edge-illumination type backlight unit in order to ensure brightness uniformity.

In order to solve the above problem, a quantum dot bar having a plurality of quantum dots, which can convert blue light into red light or green light, is positioned in front of a blue LED that emits the blue light. Thus, as the blue light is irradiated onto the quantum dot bar, the blue light, the red light and the green light are mixed and the mixed light is incident into the light guide plate, thereby generating white light.

If the white light is supplied to the light guide plate by using the quantum dot bar, high color reproduction may be realized.

The backlight unit may include an FPCB (flexible printed circuit board) provided at one side of the blue LED to supply signals and power to the LEDs and a bonding member formed under the bottom surface of the FPCB.

The display device, which is capable of displaying various images using the white light supplied to the light guide plate through the quantum dot bar as the blue light is emitted from the blue LED, has been extensively used.

A display device employing such a quantum dot is disclosed in Korean Unexamined Patent Publication No. 10-2011-0068110.

SUMMARY OF THE INVENTION

The embodiment provides an optical member representing high brightness and superior color reproduction, a display device and a light emitting device having the same.

A display device according to the embodiment includes a light source; a light conversion layer to convert a wavelength of light emitted from the light source; and a display panel into which the light is incident from the light conversion layer, wherein the light conversion layer includes a plurality of concave surfaces.

An optical member according to the embodiment includes a first substrate formed on a top surface thereof with a concavo-convex pattern; and a light conversion layer on the first substrate to cover the concavo-convex pattern.

A light emitting device according to the embodiment includes a light emitting part; and an optical member on a path of light emitted from the light emitting part, wherein the optical member includes a first substrate formed on a top surface thereof with a concavo-convex pattern; and a light conversion layer on the first substrate to cover the concavo-convex pattern.

The display device and the light emitting device according to the embodiment include the light conversion layer having a plurality of concave surfaces. In addition, the light conversion layer includes convex surfaces corresponding to the concave surfaces. In particular, the concave surfaces are formed at the bottom surface of the light conversion layer and the convex surfaces are formed at the top surface of the light conversion layer. Thus, the light conversion layer may be corrugated. That is, the light conversion layer may be formed with embossing.

Since the light conversion layer is corrugated, the path of light passing through the light conversion layer may be lengthened. Thus, the light conversion layer can convert the wavelength of the light with superior efficiency, so the optical member, the display device and the light emitting device according to the embodiment can represent the superior color reproduction.

In addition, the optical member according to the embodiment may include patterns formed on the light conversion layer and/or other layers. Thus, the optical member according to the embodiment may improve linearity and/or dispersibility of the light.

DETAILED DESCRIPTION OF THE INVENTION

In the description of the embodiments, it will be understood that when a substrate, a frame, a sheet, a layer or a pattern is referred to as being "on" or "under" another substrate, another frame, another sheet, another layer, or another pattern, it can be "directly" or "indirectly" on the other substrate, frame, sheet, layer, or pattern, or one or more intervening layers may also be present. Such a position of the layer has been described with reference to the drawings. The thickness and size of each layer shown in the drawings may be exaggerated, omitted or schematically drawn for the purpose of convenience or clarity. In addition, the size of elements does not utterly reflect an actual size.

Figure 1:
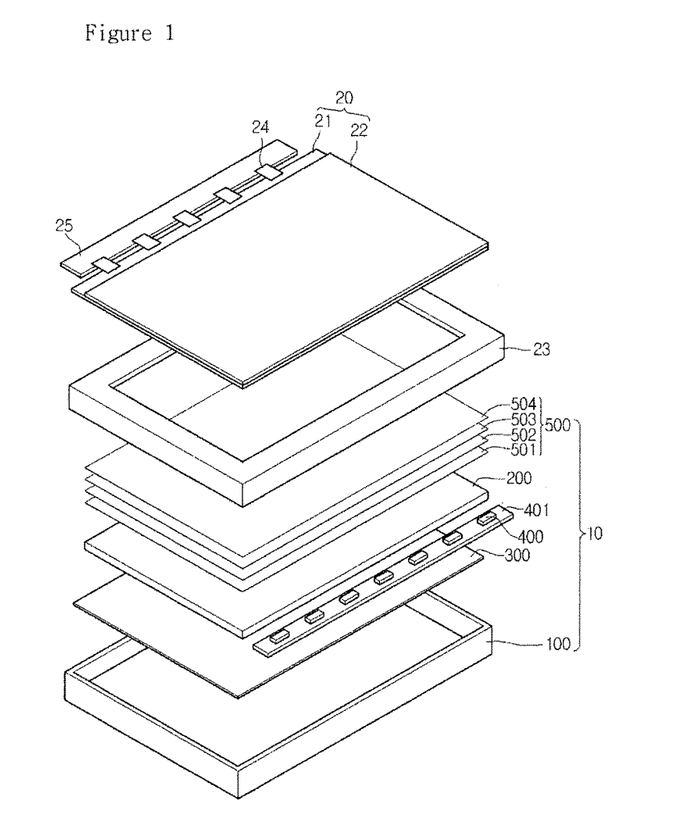
FIG. 1 is an exploded perspective view showing a liquid crystal display according to the first embodiment.
Figure 2:
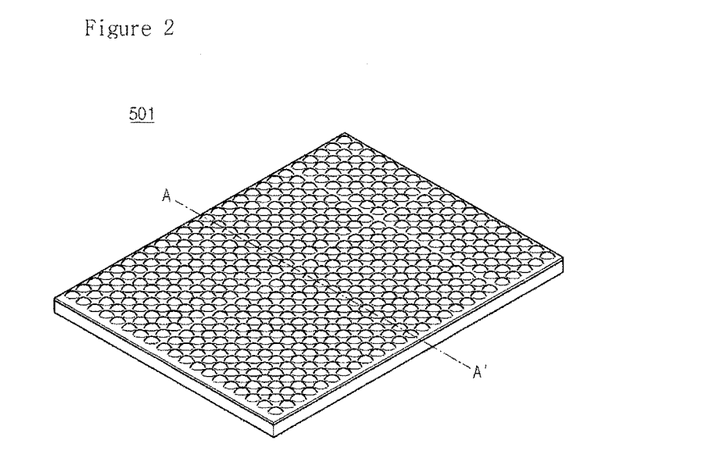
FIG. 2 is a perspective view showing a light conversion member according to the first embodiment.
Figure 3:
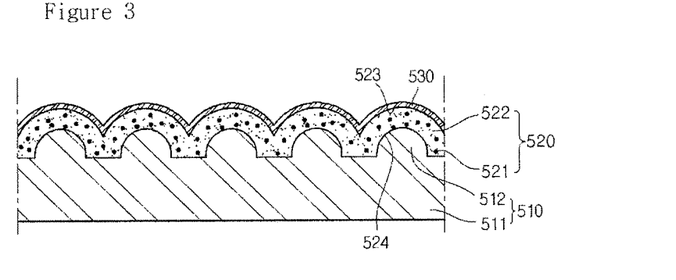
FIG. 3 is a sectional view taken along line A-A' of FIG. 2.

FIG. 1 is an exploded perspective view showing a liquid crystal display according to the first embodiment, FIG. 2 is a perspective view showing a light conversion member according to the first embodiment, FIG. 3 is a sectional view taken along line A-A' of FIG. 2, and FIGS. 4 to 7 are sectional views showing various types of light conversion members.

Referring to FIGS. 1 to 3, the liquid crystal display (LCD) according to the embodiment includes a backlight unit 10 and a liquid crystal panel 20.

The backlight unit 10 supplies light to the liquid crystal panel 20. The backlight unit 10 serves as a surface light source so that the light can be uniformly supplied to a bottom surface of the liquid crystal panel 20.

The backlight unit 10 is disposed below the liquid crystal panel 20. The backlight unit 10 includes a bottom cover 100, a light guide plate 200, a reflective sheet 300, a light source, such as a plurality of light emitting diodes 400, a printed circuit board 401, and a plurality of optical sheets 500.

The upper portion of the bottom cover 100 is open. The bottom cover 100 receives the light guide plate 200, the light emitting diodes 400, the printed circuit board 401, the reflective sheet 300, and the optical sheets 500 therein.

The light guide plate 200 is disposed in the bottom cover 100 and arranged on the reflective sheet 300. The light guide plate 200 guides the light upward by totally-reflecting, refracting and scattering the light incident thereto from the light emitting diodes 400.

The reflective sheet 300 is disposed below the light guide plate 200. In more detail, the reflective sheet 300 is disposed between the light guide plate 200 and the bottom surface of the bottom cover 100. The reflective sheet 300 reflects the light upward as the light is output downward from the bottom surface of the light guide plate 200.

The light emitting diodes 400 serve as a light source for generating the light. The light emitting diodes 400 are disposed at one lateral side of the light guide plate 200. The light generated from the light emitting diodes 400 is incident into the light guide plate 200 through the lateral side of the light guide plate 200.

The light emitting diodes 400 may include a blue light emitting diode generating the blue light or a UV light emitting diode generating the UV light. In detail, the light emitting diodes 400 may emit the blue light having the wavelength band of about 430 nm to about 470 nm or the UV light having the wavelength band of about 300 nm to about 400 nm.

The light emitting diodes 400 are mounted on the printed circuit board 401. The light emitting diodes 400 may be disposed under the printed circuit board 401. The light emitting diodes 400 are driven by receiving a driving signal through the printed circuit board 401.

The printed circuit board 401 is electrically connected to the light emitting diodes 400. The printed circuit board 401 may mount the light emitting diodes 400 thereon. The printed circuit board 401 is disposed in the bottom cover 100.

The optical sheets 500 are disposed on the light guide plate 200. The optical sheets 500 supplies the light to the liquid crystal panel 20 by changing or enhancing the optical property of the light output from the top surface of the light guide plate 200.

The optical sheets 500 may include a light conversion member 501, a diffusion sheet 502, a first prism sheet 503, and a second prism sheet 504.

The light conversion member 501 is disposed on a light path between the light emitting diodes 400 and the liquid crystal panel 20. For instance, the light conversion member 501 is disposed on the light guide plate 200. In detail, the light conversion member 501 is disposed between the light guide plate 200 and the diffusion sheet 502. The light conversion member 501 outputs the light in the upward direction by converting the wavelength of the incident light.

For instance, if the light emitting diodes 400 are blue light emitting diodes, the light conversion member 501 converts the blue light output upward from the light guide plate 200 into the green light and the red light. In detail, the light conversion member 501 converts a part of the blue light into the green light having the wavelength in the range of about 520 nm to about 560 nm, and a part of the blue light into the red light having the wavelength in the range of about 630 nm to about 660 nm.

In addition, if the light emitting diodes 400 are UV light emitting diodes, the light conversion member 501 converts the UV light output upward from the light guide plate 200 into the blue light, the green light and the red light. In detail, the light conversion member 501 converts a part of the UV light into the blue light having the wavelength in the range of about 430 nm to about 470 nm, a part of the UV light into the green light having the wavelength in the range of about 520 nm to about 560 nm, and a part of the UV light into the red light having the wavelength in the range of about 630 nm to about 660 nm.

Therefore, the white light may be generated by the light passing through the light conversion member 501 without being converted and the lights converted by the light conversion member 501. In detail, the white light can be incident into the liquid crystal panel 20 through the combination of the blue light, the green light and the red right.

That is, the light conversion member 501 is an optical member that converts the property of the incident light. The light conversion member 501 may have a shape of a sheet. That is, the light conversion member 501 is an optical sheet.

As shown in FIGS. 2 and 3, the light conversion member 501 includes a lower substrate 510, a light conversion layer 520 and a protective layer 530.

The lower substrate 510 is disposed on the light guide plate 200. The lower substrate 510 supports the light conversion layer 520 and the protective layer 530. The lower substrate 510 is transparent and flexible. For instance, transparent polymer such as PET (polyethyleneterephthalate) can be used as a material for the lower substrate 510.

In addition, the lower substrate 510 has low oxygen permeability and moisture permeability. Thus, the lower substrate 510 can protect the light conversion layer 520 from the external chemical impact, such as moisture and/or oxygen.

The lower substrate 510 includes a base layer 511 and a plurality of convex parts 512.

The base layer 511 supports the convex parts 512, the light conversion layer 520 and the protective layer 530.

The convex parts 512 are disposed on the base layer 511. The convex parts 512 protrude upward from the base layer 511. The convex parts 512 may have the embossing shape. In detail, the convex parts 512 may have the semispherical shape. The convex parts 512 may have the curvature surface. The convex parts 512 may be integrally formed with the base layer 511. The convex parts 512 may have a diameter in the range of about 1 μm to about 1 mm.

A concavo-convex pattern is formed on the base layer 511 by the convex parts 512. That is, the lower substrate 510 includes the concavo-convex pattern defined by the convex parts 512. That is, the concavo-convex pattern forms the concavo-convex structure by the convex parts 512. The concavo-convex pattern includes concave parts between the convex parts 512.

The light conversion layer 520 is disposed on the lower substrate 510. The light conversion layer 520 covers the top surface of the lower substrate 510. In detail, the light conversion layer 520 covers the convex parts 512. The light conversion layer 520 can be uniformly coated on the entire outer surface of the convex parts 512.

Therefore, the light conversion layer 520 may have the shape corresponding to the convex parts 512. That is, the light conversion layer 520 may include a plurality of convex surfaces 523 and a plurality of concave surfaces 524.

The concave surfaces 524 are formed at the side of the lower substrate 510 of the light conversion layer 520. That is, the concave surfaces 524 are formed at the bottom surface of the light conversion layer 520. The concave surfaces 524 correspond to the convex parts 512, respectively. In detail, the convex parts 512 are disposed in the concave surfaces 524, respectively. That is, the convex parts 512 are inserted into the concave surfaces 524, respectively. The shape of the concave surfaces 524 may correspond to the shape of the convex parts 512. In detail, the convex parts 512 directly make contact with the concave surfaces 524.

The concave surfaces 524 may include curvature surfaces. That is, the curvature surfaces are formed on a part or an entire area of the concave surfaces 524.

The convex surfaces 523 are formed on the top surface of the light conversion layer 520. That is, the convex surfaces 523 are formed at an upper portion of the light conversion layer 520. In other words, the top surface of the light conversion layer 520 includes the convex surfaces 523. The convex surfaces 523 correspond to the convex parts 512, respectively. That is, the convex surfaces 523 face the concave surfaces 524, respectively. The convex surfaces 523 protrude in the protrusion direction of the convex parts 512. That is, the convex surfaces 523 protrude toward the liquid crystal panel 20.

The convex surfaces 523 are defined by the convex parts 512. That is, the convex surfaces 523 may be formed as the convex parts 512 are formed. Thus, the convex surfaces 523 may have shapes similar to shapes of the convex parts 512.

The convex surfaces 523 include curvature surfaces. In detail, the curvature surfaces are formed on a part or an entire area of the convex surfaces 523. The convex surfaces 523 may improve the property of light incident into the convex surfaces 523. That is, due to the convex surfaces 523, the light conversion layer 520 may have a convex lens function and can improve the linearity of light passing through the light conversion layer 520 while minimizing the light loss.

The light conversion layer 520 converts the wavelength of the incident light. That is, the light conversion layer 520 is a wavelength conversion layer for converting the wavelength of the incident light. The light conversion layer 520 can convert the light incident through the lower substrate 510 into the blue light, green light and red light.

The light conversion layer 520 includes a host 522 and a plurality of light conversion particles 521.

The host 522 surrounds the light conversion particles 521. That is, the host 522 mainly constitutes the light conversion layer 520. The host 522 may include polymer. The host 522 is transparent. That is, the host 522 may include transparent polymer. For instance, the host 522 can be formed by using silicon resin.

The light conversion particles 521 are distributed in the host 522. In detail, the light conversion particles 521 are uniformly distributed in the host 522.

The light conversion particles 521 convert the wavelength of the light emitted from the light emitting diodes 400. In detail, the light conversion particles 521 receive light emitted from the light emitting diodes 400 to convert the wavelength of the incident light. For instance, the light conversion particles 521 may convert the blue light emitted from the light emitting diodes 400 into the green light and the red light. That is, a part of the light conversion particles 521 may convert the blue light into the green light having the wavelength in the range of about 520 nm to about 560 nm and a part of the light conversion particles 521 may convert the blue light into the red light having the wavelength in the range of about 630 nm to about 660 nm.

In addition, the light conversion particles 521 may convert the UV light emitted from the light emitting diodes 400 into the blue light, the green light and the red light. That is, a part of the light conversion particles 521 may convert the UV light into the blue light having the wavelength in the range of about 430 nm to about 470 nm, a part of the light conversion particles 521 may convert the UV light into the green light having the wavelength in the range of about 520 nm to about 560 nm and a part of the light conversion particles 521 may convert the UV light into the red light having the wavelength in the range of about 630 nm to about 660 nm.

That is, if the light emitting diodes 400 are blue light emitting diodes that emit the blue light, the light conversion particles 521 capable of converting the blue light into the green light and the red light can be employed. In addition, if the light emitting diodes are UV light emitting diodes that emit the UV light, the light conversion particles 521 capable of converting the UV light into the blue light, the green light and the red light can be employed.

The light conversion particles 521 may be prepared as quantum dots (QD). The quantum dots may include core nano-crystals and shell nano-crystals surrounding the core nano-crystals. In addition, the quantum dots may include organic ligands bonded to the shell nano-crystals. Further, the quantum dots may include an organic coating layer surrounding the shell nano-crystals.

The shell nano-crystals may be prepared as at least two layers. The shell nano-crystals are formed on the surface of the core nano-crystals. The quantum dots lengthen the wavelength of the light incident into the core nano-crystals by using the shell nano-crystals forming a shell layer, thereby improving the light efficiency.

The quantum dots may include at least one of a group-II compound semiconductor, a group-III compound semiconductor, a group-V compound semiconductor, and a group-VI compound semiconductor. In more detail, the core nano-crystals may include CdSe, InGaP, CdTe, CdS, ZnSe, ZnTe, ZnS, HgTe or HgS. In addition, the shell nano-crystals may include CuZnS, CdSe, CdTe, CdS, ZnSe, ZnTe, ZnS, HgTe or HgS. The quantum dot may have a diameter of about 1 nm to about 10 nm.

The wavelength of the light emitted from the quantum dots can be adjusted according to the size of the quantum dots. The organic ligand may include pyridine, mercapto alcohol, thiol, phosphine and phosphine oxide. The organic ligand may stabilize the unstable quantum dots after the synthesis process. Dangling bonds may be formed at the valence band and the quantum dots may be unstable due to the dangling bonds. However, since one end of the organic ligand is the non-bonding state, the one end of the organic ligand is bonded with the dangling bonds, thereby stabilizing the quantum dots.

In particular, if the size of the quantum dot is smaller than the Bohr radius of an exciton, which consists of an electron and a hole excited by light and electricity, the quantum confinement effect may occur, so that the quantum dot may have the discrete energy level. Thus, the size of the energy gap is changed. In addition, the charges are confined within the quantum dot, so that the light emitting efficiency can be improved.

Different from general fluorescent pigments, the fluorescent wavelength of the quantum dot may vary depending on the size of the particles. In detail, the light has the shorter wavelength as the size of the particle is reduced, so that the fluorescent light having the wavelength band of visible ray can be generated by adjusting the size of the particles. In addition, the quantum dot represents the extinction coefficient which is 100 to 1000 times higher than that of the general pigment and has the superior quantum yield as compared with the general pigment, so that strong fluorescent light can be generated.

The quantum dots can be synthesized through the chemical wet scheme. The chemical wet scheme is to grow the particles by immersing the precursor material in the organic solvent. According to the chemical wet scheme, the quantum dots can be synthesized.

The protective layer 530 is disposed on the light conversion layer 520. In detail, the protective layer 530 is directly coated on the host 522. In more detail, the protective layer 530 covers the convex surfaces 523. That is, the protective layer 530 can be coated on the outer surfaces of the convex surfaces 523. Thus, the protective layer 530 may have the shape corresponding to the shape of the convex surfaces 523. That is, the protective layer 530 may be formed with embossing.

The protective layer 530 covers the light conversion particles 521. Thus, the protective layer 530 protects the light conversion particles 521. That is, the protective layer 530 protects the light conversion particles 521 from the external moisture and/or oxygen.

The protective layer 530 can be formed by using silicon oxide.

The protective layer 530 may have the refractive index lower than that of the host 522. Thus, the protective layer 530 serves as an optical buffer between the light conversion layer 520 and an air layer. Therefore, the light passing through the light conversion layer 520 can be effectively emitted upward due to the protective layer 530.

Figure 4:
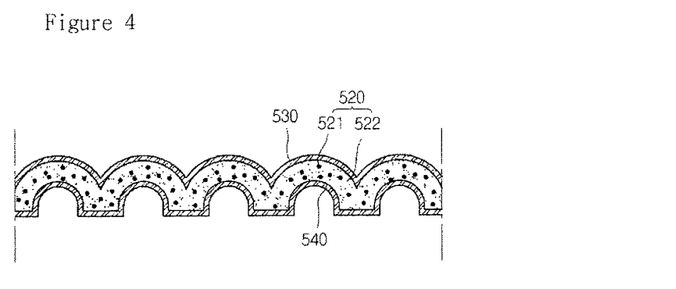
FIGS. 4 to 7 are sectional views showing various types of light conversion members.

Referring to FIG. 4, the lower substrate 510 may be omitted. That is, after the light conversion layer 520 has been formed through the photo curing process and/or the thermal curing process, the light conversion layer 520 can be separated from the lower substrate 510.

A lower protective layer 540 can be formed on the bottom surface of the light conversion layer 520. The lower protective layer 540 is coated on the bottom surface of the light conversion layer 520. In addition, the lower protective layer 540 can be coated on the inner surfaces of the concave surfaces 524.

The lower protective layer 540 may have the refractive index lower than that of the host 522. Thus, the lower protective layer 540 may serve as an anti-reflective layer for improving the efficiency of the light incident into the light conversion layer 520.

The lower protective layer 540 covers the bottom surface of the light conversion layer 520. Thus, the lower protective layer 540 protects the light conversion particles 521. That is, the lower protective layer 540 protects the light conversion particles 521 from the external moisture and/or oxygen.

The lower protective layer 540 can be formed by using silicon oxide.

Figure 5:
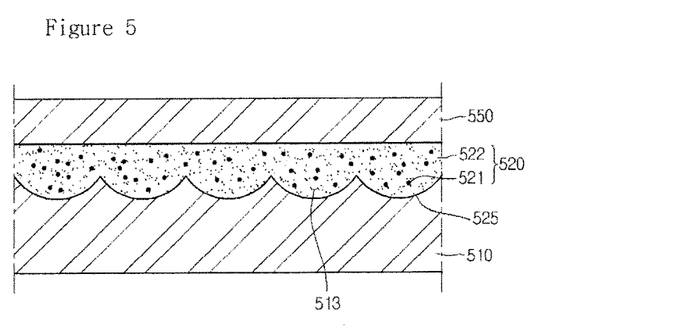

Referring to FIG. 5, the light conversion layer 520 may include convex surfaces 525 protruding downward. In detail, the light conversion layer 520 may include convex surfaces 525 protruding toward the lower substrate 510.

That is, the lower substrate 510 includes a plurality of grooves 513. In detail, the concavo-convex pattern defined by the grooves 513 is formed on the top surface of the lower substrate 510. The convex surfaces 525 of the light conversion layer 520 may correspond to the grooves 513, respectively. That is, the convex surfaces 525 of the light conversion layer 520 are disposed in the grooves 513 while directly making contact with the inner surfaces of the grooves 513, respectively.

The grooves 513 have concave shapes. Curvature surfaces are formed at a part or an entire area of the grooves 513.

In addition, the light conversion member 501 may further include an upper substrate 550. The bottom surface of the upper substrate 550 may be flat. In addition, the bottom surface of the upper substrate 550 directly makes contact with the light conversion layer 520. In detail, the bottom surface of the upper substrate 550 makes contact with the entire surface of the light conversion layer 520. Thus, the top surface of the light conversion layer 520 may be flat.

Figure 6:
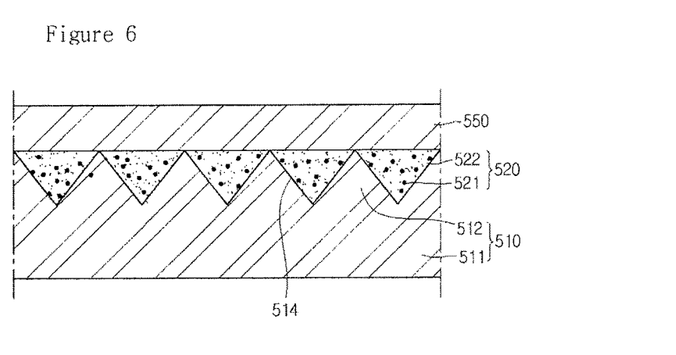

Referring to FIG. 6, the concavo-convex pattern 512 of the lower substrate 510 may include an inclined surface 514. The inclined surface 514 may be inclined with respect to the bottom surface of the lower substrate 510. That is, the concavo-convex pattern 512 of the lower substrate 510 may have the mountain shape. In detail, the concavo-convex pattern 512 of the lower substrate 510 may have the convex parts having the polygonal cone shape. In addition, the concavo-convex pattern 512 may have the triangular prism shape extending in the horizontal direction.

The convex parts 512 of the lower substrate 510 may directly make contact with the bottom surface of the upper substrate 550. Thus, the light conversion layer 520 can be divided by the convex parts 512 of the lower substrate 510. That is, the light conversion layer 520 may be disposed between the convex parts 512 of the lower substrate 510.

Figure 7:
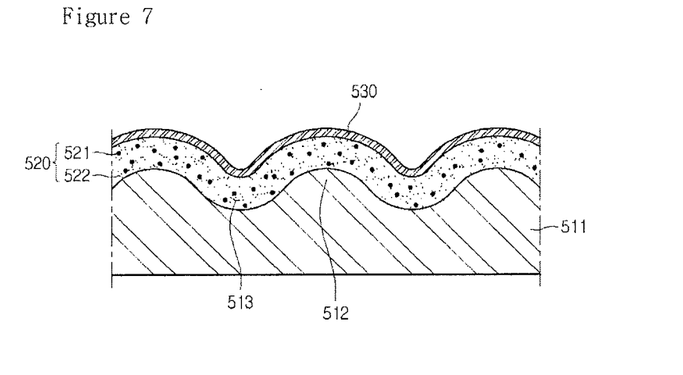

Referring to FIG. 7, the lower substrate 510 includes a plurality of convex parts 512 and a plurality of grooves 513. The convex parts 512 and the grooves 513 may be alternately arranged. Thus, the light conversion layer 520 may be corrugated in the shape of waves. That is, the light conversion layer 520 may have the corrugated shape.

The diffusion sheet 502 is disposed on the light conversion member 501. The diffusion sheet 502 may improve the uniformity of light passing through the diffusion sheet 502. The diffusion sheet 502 may include a plurality of beads.

The first prism sheet 503 is provided on the diffusion sheet 502. The second prism sheet 504 is provided on the first prism sheet 503. The first prism sheet 503 and the second prism sheet 504 may improve the linearity of light passing therethrough.

The liquid crystal panel 20 is disposed on the optical sheets 500. In addition, the liquid crystal panel 20 is disposed on a panel guide 23. The liquid crystal panel 20 is guided by the panel guide 23.

The liquid crystal panel 20 displays images by adjusting intensity of light passing through the liquid crystal panel 20. In detail, the liquid crystal panel 20 is a display panel for displaying the images by using the light emitted from the backlight unit 10. The liquid crystal panel 20 includes a TFT substrate 21, a color filter substrate 22 and a liquid crystal layer interposed between the two substrates. In addition, the liquid crystal panel 20 includes polarizing filters.

Hereinafter, the TFT substrate 21 and the color filter substrate 22 will be described in detail although it is not shown in the drawings in detail. The TFT substrate 21 includes a plurality of gate lines and a plurality of data lines crossing the gate lines to define pixels and a thin film transistor (TFT) is provided at each cross section such that the thin film transistor TFT can be connected to a pixel electrode of the pixel in one-to-one correspondence. The color filter substrate 22 includes color filters having R, G and B colors corresponding to the pixels, a black matrix covering the gate lines, data lines and thin film transistors within the limit of the color filters, and a common electrode covering the above elements.

A driving PCB 25 is provided at an outer peripheral portion of the liquid crystal panel 20 to supply driving signals to the gate lines and data lines.

The driving PCB 25 is electrically connected to the liquid crystal panel 20 by a COF (chip on film) 24. The COF 24 may be replaced with a TCP (tape carrier package).

As described above, various patterns can be formed on the light conversion layer 520. That is, the light conversion layer 520 may include the convex surfaces 523 and the concave surfaces 524, so the light conversion layer 520 may be corrugated. That is, the light conversion layer 520 may be formed with embossing.

Since the light conversion layer 520 is corrugated, the path of light passing through the light conversion layer 520 may be lengthened. Thus, a greater amount of lights can be incident into the light conversion particles 521 and the light conversion layer 520 can convert the wavelength of the light with superior efficiency. Therefore, the liquid crystal display according to the embodiment can represent the superior color reproduction.

In addition, the light conversion member 501 may include various patterns formed on the light conversion layer 520, the lower substrate 510, the protective layer 530 and/or the upper substrate 550. These patterns may improve linearity and/or dispersibility of the light emitted from the light conversion member 501.

Accordingly, the liquid crystal display according to the embodiment may represent the superior linearity, dispersibility or color reproduction of the light.

Figure 8:
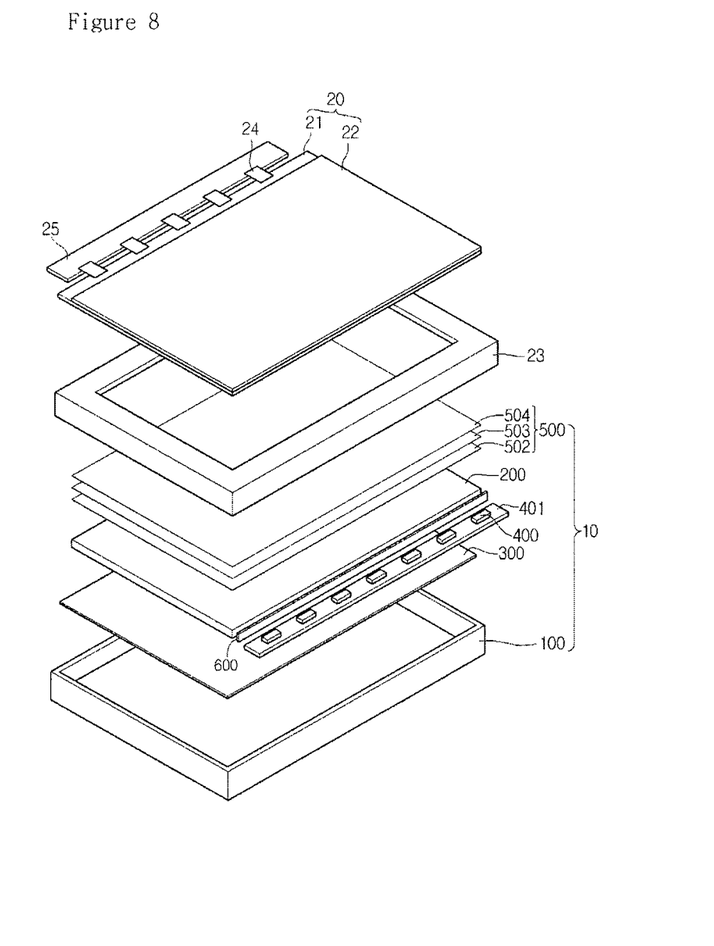
FIG. 8 is an exploded perspective view showing a liquid crystal display according to the second embodiment.
Figure 9:
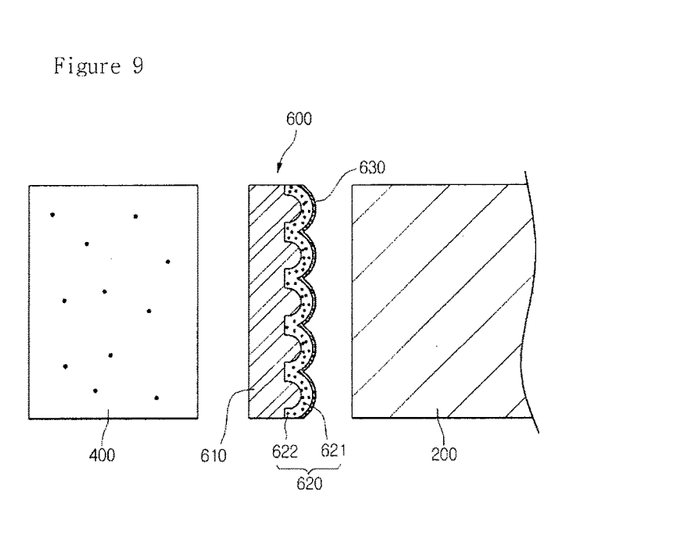
FIG. 9 is a sectional view showing a light emitting diode, a light conversion member and a light guide plate according to the second embodiment.

FIG. 8 is an exploded perspective view showing a liquid crystal display according to the second embodiment and FIG. 9 is a sectional view showing a light emitting diode, a light conversion member and a light guide plate according to the second embodiment. In the description about the present embodiment, the previous embodiment will be incorporated by reference. That is, the previous description of the liquid crystal device may be incorporated herein by reference except for the modified parts.

Referring to FIGS. 8 and 9, the light conversion member 600 is interposed between the light emitting diodes 400 and the light guide plate 200.

The light conversion member 600 may extend in one direction. In detail, the light conversion member 600 may extend along one lateral side of the light guide plate 200. In more detail, the light conversion member 600 may extend along an incident surface of the light guide plate 200.

The light conversion member 600 receives light emitted from the light emitting diodes 400 to convert the wavelength of the incident light. For instance, the light conversion member 600 may convert the blue light emitted from the light emitting diodes 400 into the green light and the red light. That is, the light conversion member 600 may convert a part of the blue light into the green light having the wavelength in the range of about 520 nm to about 560 nm and convert a part of the blue light into the red light having the wavelength in the range of about 630 nm to about 660 nm.

In addition, the light conversion member 600 can convert the UV light emitted from the light emitting diodes 400 into the blue light, the green light and the red light. In detail, the light conversion member 600 converts a part of the UV light into the blue light having the wavelength in the range of about 430 nm to about 470 nm, a part of the UV light into the green light having the wavelength in the range of about 520 nm to about 560 nm, and a part of the UV light into the red light having the wavelength in the range of about 630 nm to about 660 nm.

Therefore, the white light may be generated by the light passing through the light conversion member 600 and the lights converted by the light conversion member 600. In detail, the white light can be incident into the liquid guide plate 200 through the combination of the blue light, the green light and the red right.

As shown in FIG. 9, the light conversion member 600 includes the lower substrate, the light conversion layer and the protective layer 630. In addition, the light conversion layer includes the host and a plurality of light conversion particles and has a corrugated shape.

The light conversion member 600 according to the present embodiment is substantially identical to the light conversion member 501 of the previous embodiment.

In the liquid crystal display according to the present embodiment, the light conversion member 600 has a relatively small size. Thus, the liquid crystal display according to the present embodiment can be fabricated by using a smaller amount of light conversion particles 620.

Therefore, the liquid crystal display according to the present embodiment can be readily fabricated at the low cost while reducing the amount of the light conversion particles 620.

Figure 10:
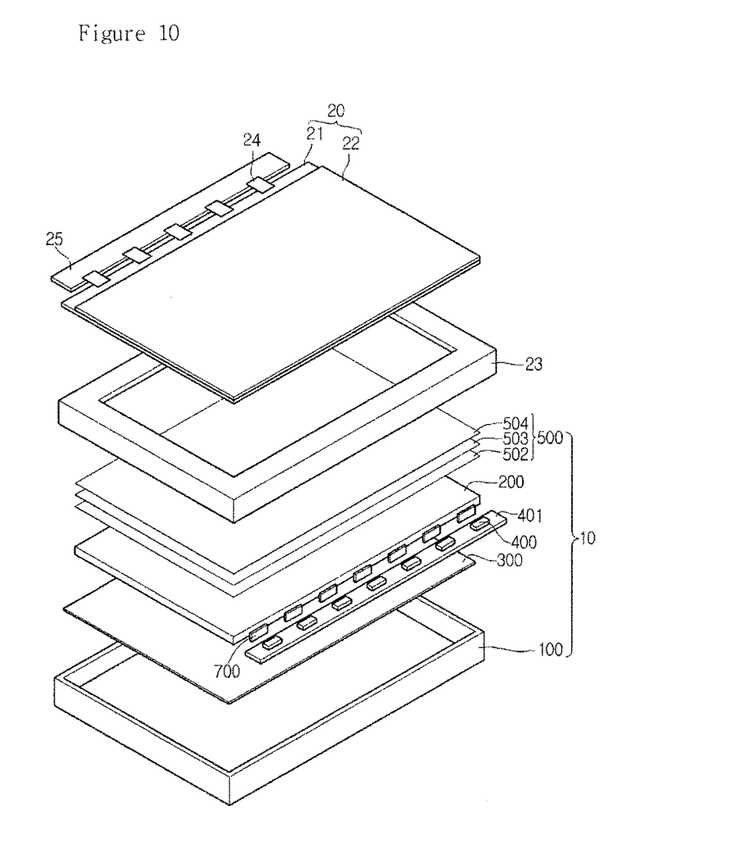
FIG. 10 is an exploded perspective view showing a liquid crystal display according to the third embodiment.

FIG. 10 is an exploded perspective view showing a liquid crystal display according to the third. In the description about the present embodiment, the previous embodiments will be incorporated by reference. That is, the previous description of the liquid crystal device may be incorporated herein by reference except for the modified parts.

Referring to FIG. 10, the liquid crystal display according to the present embodiment includes a plurality of light conversion members 700. The light conversion members 700 correspond to the light emitting diodes 400, respectively.

The light conversion members 700 are disposed between the light emitting diodes 400 and the light guide plate 200. That is, each light conversion member 700 is disposed between each light emitting diode 400 and the light guide plate 200.

The light conversion members 700 convert the wavelength of the light emitted from the corresponding light emitting diode. At this time, the light conversion members 700 may be divided into first light conversion members 700 that convert the wavelength of the light emitted from the light emitting diodes into the first wavelength of the light, such as the green light, and second light conversion members 700 that convert the wavelength of the light emitted from the light emitting diodes into the second wavelength of the light, such as the red light.

The light conversion members 700 may have a surface area larger than that of the light emitting diodes 400. Thus, most of the light emitted from the light emitting diodes can be incident into the corresponding light conversion member 700.

In the liquid crystal display according to the present embodiment, the light conversion member 700 has a relatively small size. Thus, the liquid crystal display according to the present embodiment can be fabricated by using a smaller amount of light conversion particles.

Therefore, the liquid crystal display according to the present embodiment can be readily fabricated at the low cost while reducing the amount of the light conversion particles.

In addition, the characteristic of each light conversion member 700 can be changed suitably for the corresponding light emitting diode. Thus, the liquid crystal display according to the embodiment may have the superior reliability, brightness and uniform color reproduction.

Hereinafter, the light emitting device according to the embodiment will be described with reference to FIGS. 11 to 13.

Figure 11:
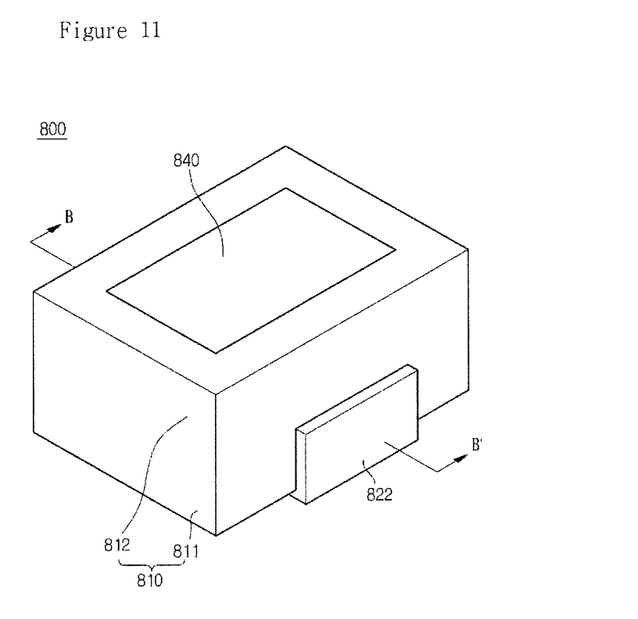
FIG. 11 is a perspective view showing a light emitting device package according to the embodiment.
Figure 12:
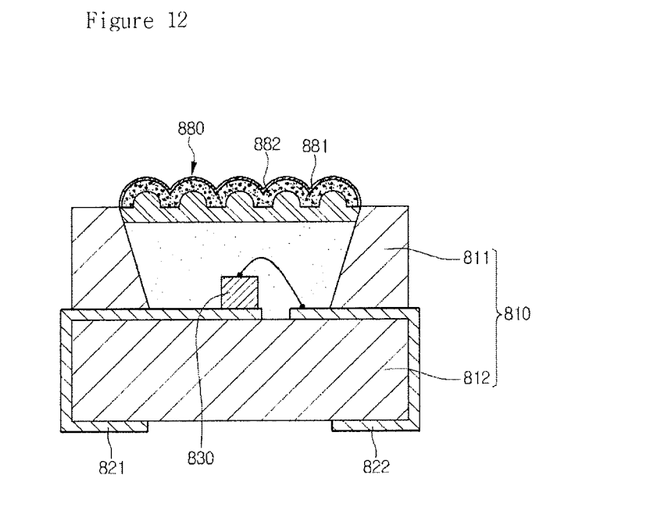
FIG. 12 is a sectional view taken along line B-B' of FIG. 11.
Figure 13:
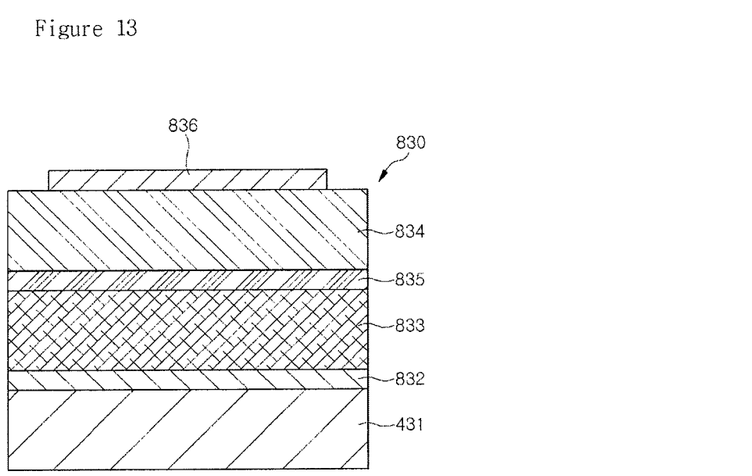
FIG. 13 is a sectional view showing a light emitting diode chip.

FIG. 11 is a perspective view showing a light emitting device package according to the embodiment, FIG. 12 is a sectional view taken along line C-C' of FIG. 11, and FIG. 13 is a sectional view showing a light emitting diode chip. In the description about the light emitting device package according to the embodiment, the previous description about the light conversion member will be incorporated by reference. That is, the previous description of the light conversion member may be incorporated herein by reference except for the modified parts.

Referring to FIGS. 11 to 13, the light emitting device package according to the embodiment includes a body 810, a plurality of lead electrodes 821 and 822, a light emitting part 830, a filling part 840, a plurality of wavelength conversion particles 850 and a plurality of electron receiving particles 860.

The body 810 receives the light emitting part 830, the filling part 840, the wavelength conversion particles 850 and the electron receiving particles 860 therein and supports the lead electrodes 821 and 822.

The body 810 may be formed by using one of a resin material, such as PPA, a ceramic material, liquid crystal polymer (LCP), syndiotactic (SPS), poly phenylene ether (PPS), and a silicon material, but the embodiment is not limited thereto. The body 810 can be integrally formed through the injection molding or can be formed by laminating a plurality of layers.

The body 810 includes a cavity C having an open upper portion. The cavity C can be formed by patterning, punching, cutting or etching the body 810. In addition, the cavity C can be formed by using a metal mold having the structure equal to the structure of the cavity C when the body 810 is formed.

The cavity C may have a cup shape or a concave vessel shape. In addition, the cavity C may have a surface of a circular shape, a polygonal shape or a random shape, but the embodiment is not limited thereto.

The inner wall of the cavity C may be vertical or inclined to the bottom surface of the cavity C by taking the light distribution angle of the light emitting device package into consideration.

The body 810 may include a base part 811 and a receiving part 812.

The base part 811 supports the receiving part 812. In addition, the base part 811 supports the lead electrodes 821 and 822. For instance, the base part 811 may have a rectangular parallelepiped shape.

The receiving part 812 is disposed on the base part 811. The cavity C is defined by the receiving part 812. That is, the cavity is a groove formed in the receiving part 812. The receiving part 812 surrounds the cavity C. When viewed from the top, the receiving part 812 may have a closed loop shape. For instance, the receiving part 812 may have a wall shape surrounding the cavity C.

The receiving part 812 includes a top surface, an outer surface and an inner surface. The Inner surface is an inclined surface, which is inclined with respect to the top surface.

The lead electrodes 821 and 822 can be realized as a lead frame, but the embodiment is not limited thereto.

The lead electrodes 821 and 822 are disposed in the body 810 and installed on the bottom surface of the cavity C while being electrically isolated from each other. Outer portions of the lead electrodes 821 and 822 are exposed out of the body 810.

End portions of the lead electrodes 821 and 822 are located at one lateral side or the other lateral side of the cavity C.

The lead electrodes 821 and 822 can be prepared as lead frames, which can be formed when the body 810 is injection molded. For instance, the lead electrodes 821 and 822 include a first lead electrode 821 and a second lead electrode 822.

The first lead electrode 821 is spaced apart from the second lead electrode 822. In addition, the first lead electrode 821 and the second lead electrode 822 are electrically connected to the light emitting part 830.

The light emitting part 830 includes at least one light emitting diode chip. For instance, the light emitting part 830 may include a blue light emitting diode chip or a UV light emitting diode chip.

The light emitting part 830 may be a lateral type light emitting diode chip or a vertical type light emitting diode chip. As shown in FIG. 6, the light emitting part 830 may include a conductive substrate 831, a light reflective layer 832, a first conductive semiconductor layer 833, a second conductive semiconductor layer 834, an active layer 835 and a second electrode 836.

The conductive substrate 831 consists of a conductor. The conductive substrate 831 supports the light reflective layer 832, the first conductive semiconductor layer 833, the second conductive semiconductor layer 834, the active layer 835 and the second electrode 836.

The conductive substrate 831 is connected to the first conductive semiconductor layer 833 through the light reflective layer 832. That is, the conductive substrate 831 serves as a first electrode for supplying an electric signal to the first conductive semiconductor layer 833.

The light reflective layer 832 is disposed on the conductive substrate 831. The light reflective layer 832 reflects the light emitted from the active layer 835 in the upward direction. In addition, the light reflective layer 832 is a conductive layer. Thus, the light reflective layer 832 connects the conductive substrate 831 to the first conductive semiconductor layer 833. The light reflective layer 832 may be formed by using a metal, such as Ag or Al.

The first conductive semiconductor layer 833 is formed on the light reflective layer 832. The first conductive semiconductor layer 833 has a first conductive type. The first conductive semiconductor layer 833 is an N type semiconductor layer. For instance, the first conductive semiconductor layer 833 is an N type GaN layer.

The second conductive semiconductor layer 834 is formed on the first conductive semiconductor layer 833. The second conductive semiconductor layer 834 is a P type semiconductor layer facing the first conductive semiconductor layer 833. For instance, the second conductive semiconductor layer 834 is a P type GaN layer.

The active layer 835 is interposed between the first conductive semiconductor layer 833 and the second conductive semiconductor layer 834. The active layer 835 may have a single quantum well structure or a multiple quantum well structure. The active layer 835 may have a periodicity of an InGaN well layer and an AlGaN barrier layer or an InGaN well layer and a GaN barrier layer. The light emitting material for the active layer 835 may vary depending on the light emission wavelengths, such as the blue, red and green wavelengths.

The second electrode 836 is formed on the second conductive semiconductor layer 834. The second electrode 836 is connected to the second conductive semiconductor layer 834.

Meanwhile, the light emitting part 830 may be a lateral type LED. An additional wire may be necessary to connect the lateral type LED to the first lead electrode 821.

The light emitting part 830 is connected to the first lead electrode 821 through a bump and connected to the second lead electrode 822 through a wire. In particular, the light emitting part 830 can be directly formed on the first lead electrode 821.

Besides the above, the light emitting part 830 can be connected to the first and second lead electrodes 821 and 822 through the wire bonding, the die bonding or the flip bonding scheme, but the embodiment is not limited thereto.

The filling part 840 is formed in the cavity C. The filling part 840 is transparent. The filling part 840 may include a material, such as silicon or epoxy, or a material having the refractive index of 2 or less. The filling part 840 covers the light emitting part 830. The filling part 840 may directly make contact with the light emitting part 830.

A reflective layer can be formed on the inner wall of the cavity C. The reflective layer may include a material having high reflective property, such as white PSR (photo solder resist) ink, Ag or Al.

As shown in FIG. 12, the wavelength conversion member 880 is formed on the surface of the filling part 840 in the form of a sheet, that is, in the form of the layered structure. In detail, the solution including the host 881 and the wavelength conversion particles 882 is coated on the filling part 840 in a state in which the solvent is not removed, and then the solvent is evaporated. Thus, the wavelength conversion member 880 is formed as the layered structure.

The wavelength conversion member 880 is substantially identical to the wavelength conversion member that has been described above. That is, the wavelength conversion member 880 includes a lower substrate, a light conversion layer and a protective layer, in which the lower substrate and the light conversion layer include convex parts and concave surfaces. That is, the wavelength conversion member that has been described above is substantially equal to the wavelength conversion member 880 of the light emitting device according to the present embodiment.

The wavelength conversion particles 882 may convert the blue light emitted from the light emitting part 830 into the green light. In detail, the wavelength conversion particles 882 may convert the blue light emitted from the light emitting part 830 into the light having the wavelength band in the range of about 500 nm to about 599 nm.

In addition, the wavelength conversion particles 882 may convert the blue light emitted from the light emitting part 830 into the green light. In detail, the wavelength conversion particles 882 may convert the blue light emitted from the light emitting part 830 into the light having the wavelength band in the range of about 600 nm to about 700 nm.

Further, when the light emitting part 830 emits the UV light, the wavelength conversion particles 882 may convert the radiant UV light into the blue light.

That is, the wavelength conversion particles 882 receive the light emitted the light emitting part 830 and convert the wavelength of the light. As described above, the wavelength conversion particles 882 can convert the incident blue light into the green light and red light.

In addition, the wavelength conversion particles 882 can convert the UV light emitted from the light emitting part 830 into the blue light, the green light and red light.

Thus, the white light can be generated by the light converted by the wavelength conversion particles 882 and the light which is not converted by the wavelength conversion particles 882. That is, the white light can be emitted through the combination of the blue light, green light and red light.

Hereinafter, the lighting device according to the embodiment will be described with reference to FIG. 14.

Figure 14:
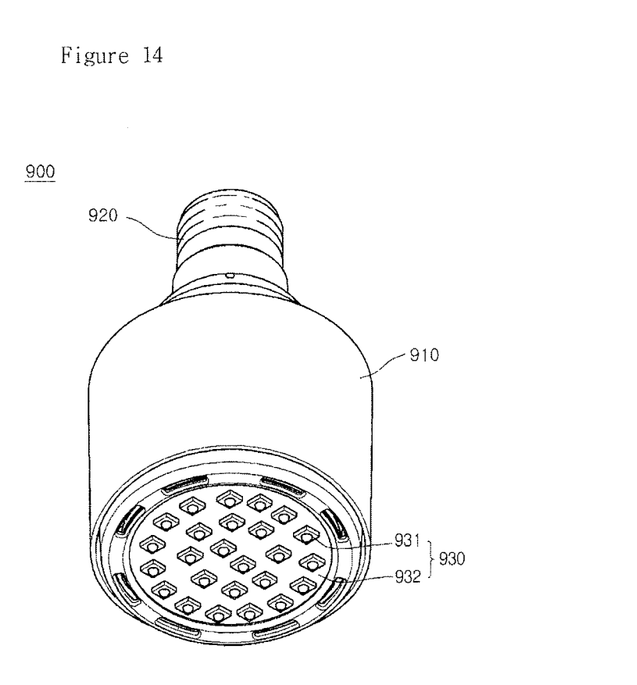
FIG. 14 is a perspective view showing a lighting device according to the embodiment.

FIG. 14 is a perspective view showing the lighting device according to the embodiment. Referring to FIG. 14, the lighting device 900 includes a case 910, a light emitting module 930 installed in the case 910, and a connection terminal 920 installed in the case 910 to receive power from an external power source.

Preferably, the case 910 includes a material having superior heat dissipation property. For instance, the case 910 includes a metallic material or a resin material.

The light emitting module 930 may include a substrate 932 and light emitting device packages 931 according to the embodiment, which are installed on the substrate 932. The light emitting device packages 931 are spaced apart from each other or arranged in the form of a matrix. The light emitting device packages 931 can be basically incorporated with the light emitting device that has been previously described with reference to FIGS. 11 to 13.

The substrate 932 includes an insulating member printed with a circuit pattern. For instance, the substrate 932 includes a PCB (printed circuit board), an MC (metal core) PCB, an FPCB (flexible PCB), a ceramic PCB, and an FR-4 substrate.

In addition, the substrate 932 may include a material that effectively reflects the light. A coating layer can be formed on the surface of the substrate 932. At this time, the coating layer has a white color or a silver color to effectively reflect the light.

At least one light emitting device package 931 is installed on the substrate 932. Each light emitting device package 931 may include at least one LED (light emitting diode) chip. The LED chip may include an LED that emits the light of visible ray band having red, green, blue or white color and a UV (ultraviolet) LED that emits UV light.

The light emitting device packages 931 of the light emitting module 930 can be variously combined to provide various colors and brightness. For instance, the white LED, the red LED and the green LED can be combined to achieve the high color rendering index (CRI).

The connection terminal 920 is electrically connected to the light emitting module 930 to supply power to the light emitting module 930. The connection terminal 920 has a shape of a socket screw-coupled with the external power source, but the embodiment is not limited thereto. For instance, the connection terminal 920 can be prepared in the form of a pin inserted into the external power source or connected to the external power source through a wire.

That is, the optical member and the light emitting device described above can be employed in the lighting device.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effects such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
    a display panel;
    a light guide plate having an upper surface facing the display panel, a bottom surface and side surfaces;
    at least one prism sheet disposed between the display panel and the light guide plate;
    a light source including a plurality of light emitting diodes and being disposed laterally to the light guide plate to emit light into at least one side surface of the light guide plate;
    a reflective sheet disposed below the light guide plate to reflect the light upward as the light is output downward from the bottom surface of the light guide plate;
    a light conversion layer interposed between the light guide plate and the display panel and including a host and a plurality of quantum dots in the host to convert a wavelength of the light guided by the light guide plate upwards toward the display panel;
    a lower substrate including polyethyleneterephthalate (PET) having an upper surface supporting the light conversion layer, a bottom surface, and side surfaces,
    a concavo-convex pattern including convex parts and concave parts between the convex parts disposed in the upper surface of the lower substrate; and an upper substrate having a flat upper surface, a flat bottom surface, and side surfaces and including PET, wherein the light conversion layer includes a concavo-convex surface corresponding to the concavo-convex pattern to have a concave surface and a convex surface, wherein the convex parts have a diameter in a range of about 1 μm to about 1 mm,
    wherein the convex parts directly contact the concave surfaces, and
    wherein a thickness of the light guide plate is greater than a thickness of the light conversion layer.

2. The display device of claim 1, wherein the convex parts protrude towards the upper substrate.

3. The display device of claim 1, wherein the light conversion layer extends continuously over the convex parts and the concave parts.

4. The display device of claim 1, wherein the light emitting diodes are spaced at a predetermined pitch on a printed circuit board, and
    wherein at least three concave parts are provided per each predetermined pitch.

5. The display device of claim 1, wherein each of the concavo-convex pattern includes an inclined surface inclined with respect to a bottom surface of the lower substrate.

6. The display device of claim 1, wherein the concave parts and the light emitting diodes of the light source do not overlap.

7. The display device of claim 1,
    wherein the wavelength of light is converted over a length of the concavo-convex surface including the concave surface and the convex surface.

8. The display device of claim 1, further comprising:
    at least one oxide layer disposed on the upper substrate.

* * * * *